US009069570B2

(12) United States Patent
Asai

(10) Patent No.: US 9,069,570 B2
(45) Date of Patent: Jun. 30, 2015

(54) INFORMATION PROCESSING DEVICE, AND METHOD AND COMPUTER READABLE MEDIUM THEREFOR

(75) Inventor: Norihiko Asai, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1321 days.

(21) Appl. No.: 12/184,590

(22) Filed: Aug. 1, 2008

(65) Prior Publication Data

US 2009/0037903 A1 Feb. 5, 2009

(30) Foreign Application Priority Data

Aug. 3, 2007 (JP) ................................. 2007-203154

(51) Int. Cl.
G06F 9/445 (2006.01)
G06F 9/44 (2006.01)

(52) U.S. Cl.
CPC .................................... G06F 9/4411 (2013.01)

(58) Field of Classification Search
USPC ......................................................... 717/174
See application file for complete search history.

(56) References Cited

U.S. PATENT DOCUMENTS

| 5,265,252 | A | * | 11/1993 | Rawson et al. ............... 719/326 |
| 6,452,692 | B1 | * | 9/2002 | Yacoub ........................ 358/1.15 |
| 6,888,641 | B2 | * | 5/2005 | Koana .......................... 358/1.15 |
| 7,076,575 | B2 | * | 7/2006 | Baitinger et al. ............... 710/28 |
| 7,506,142 | B2 | * | 3/2009 | Yoshimura et al. .............. 713/1 |
| 8,159,703 | B2 | * | 4/2012 | Murase ........................ 358/1.15 |
| 8,213,033 | B2 | * | 7/2012 | Choi et al. .................... 358/1.15 |
| 2002/0156947 | A1 | * | 10/2002 | Nishio .............................. 710/36 |
| 2003/0037327 | A1 | * | 2/2003 | Cicciarelli et al. ............. 717/178 |
| 2003/0046447 | A1 | * | 3/2003 | Kouperchliak et al. ........ 709/321 |
| 2003/0225933 | A1 | * | 12/2003 | Suzuki .......................... 709/321 |
| 2003/0231328 | A1 | * | 12/2003 | Chapin et al. ................. 358/1.13 |
| 2004/0187105 | A1 | * | 9/2004 | Inada ............................ 717/174 |
| 2004/0210680 | A1 | * | 10/2004 | Yamamura et al. ............... 710/8 |
| 2004/0215754 | A1 | * | 10/2004 | Orleth et al. .................. 709/223 |
| 2005/0039193 | A1 | * | 2/2005 | Choi et al. .................... 719/321 |
| 2005/0060649 | A1 | * | 3/2005 | Kimura et al. ................ 715/526 |

(Continued)

FOREIGN PATENT DOCUMENTS

JP 10-154121 6/1998
JP 2000-330742 11/2000

(Continued)

OTHER PUBLICATIONS

Notification of Reasons of Rejection for Japanese Application 2007-203154 mailed Jul. 14, 2009.

(Continued)

*Primary Examiner* — Lewis A Bullock, Jr.
*Assistant Examiner* — Keith C Yuen
(74) *Attorney, Agent, or Firm* — Banner & Witcoff, Ltd.

(57) ABSTRACT

An information processing device, configured to be connected with a plurality of devices, includes a device extracting unit configured to extract, from the plurality of devices connected with the information processing device, a plurality of first devices of which respective drivers for controlling the plurality of first devices are to be installed into the information processing device, and an installation executing unit configured to consecutively install, into the information processing device, the respective drivers of the plurality of first devices extracted by the device extracting unit, in a single installation.

14 Claims, 7 Drawing Sheets

(56) References Cited

U.S. PATENT DOCUMENTS

| | | | |
|---|---|---|---|
| 2006/0221372 A1* | 10/2006 | Onishi et al. | 358/1.13 |
| 2006/0224780 A1* | 10/2006 | Saito | 710/8 |
| 2006/0230261 A1 | 10/2006 | Yoshimura et al. | |
| 2007/0083679 A1 | 4/2007 | Kikuchi | |
| 2007/0245358 A1* | 10/2007 | Hattori et al. | 719/321 |
| 2009/0083651 A1* | 3/2009 | Kim et al. | 715/771 |

FOREIGN PATENT DOCUMENTS

| | | |
|---|---|---|
| JP | 2000-330919 | 11/2000 |
| JP | 2001-117834 | 4/2001 |
| JP | 2001-325170 | 11/2001 |
| JP | 2003-006133 | 1/2003 |
| JP | 2003-131827 | 5/2003 |
| JP | 2003-150341 | 5/2003 |
| JP | 2004-005224 | 1/2004 |
| JP | 2006-172031 | 6/2006 |
| JP | 2006-190320 | 7/2006 |
| JP | 2006-2938771 | 10/2006 |
| JP | 2006-350652 | 12/2006 |
| JP | 2007-066189 | 3/2007 |

OTHER PUBLICATIONS

Notification of Reasons of Rejection for corresponding Japanese Patent Application 2007-203154 mailed Apr. 20, 2010.

* cited by examiner

INFORMATION PROCESSING DEVICE, AND METHOD AND COMPUTER READABLE MEDIUM THEREFOR

CROSS-REFERENCE TO RELATED APPLICATION

This application claims priority under 35 U.S.C. §119 from Japanese Patent Application No. 2007-203154 filed on Aug. 3, 2007. The entire subject matter of the application is incorporated herein by reference.

BACKGROUND

1. Technical Field

The following description relates to one or more technologies to install a device driver into an information processing device.

2. Related Art

There has been known an installation program (so-called installer) for installing respective drivers of a plurality of devices such as printers into an information processing device (e.g., personal computer) connected with the devices via a computer network.

An installer of this kind is configured to acquire identification data for identifying the devices on the computer network and to display, on a display unit of the information processing device, a list of the devices on the computer network based upon the identification data acquired. In addition, according to the installer, it is possible to install a driver of a user-selected one of the devices on the list (for example, see Japanese Patent Provisional Publication No. 2000-330742, which will hereinafter be referred to as '742 Publication).

It is noted that "installing" referred to here includes operations of creating a setting file containing settings utilized for the information processing device to control the user-selected device, storing the created setting file and a driver file for driving the device into the information processing device, and registering the stored setting file and driver file with a registry. Further, the settings contained in the setting file include a setting regarding an output port based upon an IP address of the device.

SUMMARY

Thus, when the drivers of a plurality of devices are installed into the information processing device with the installer described in '742 Publication, it is required for installing a subsequent device driver to launch the installer again after installation of a previous device driver is completed.

Therefore, a user has to perform troublesome operations of repeatedly launching the installer described in '742 Publication times of the number of the devices when installing the drivers of the plurality of devices.

Aspects of the present invention provide one or more improved information processing devices and computer readable media that make it possible to install respective drivers of a plurality of devices without a troublesome user operation.

According to aspects of the present invention, there is provided an information processing device configured to be connected with a plurality of devices, which includes a device extracting unit configured to extract, from the plurality of devices connected with the information processing device, a plurality of first devices of which respective drivers for controlling the plurality of first devices are to be installed into the information processing device, and an installation executing unit configured to consecutively install, into the information processing device, the respective drivers of the plurality of first devices extracted by the device extracting unit, in a single installation.

Namely, in some aspects of the present invention, target devices (first devices) of which respective drivers are to be installed into the information processing device are extracted from devices connected with a network (e.g., LAN connected with the devices and the information processing device). Then, the respective drivers corresponding to the target devices as extracted are consecutively installed in a single installation.

Therefore, even though there are a plurality of target devices, a user can install the respective drivers of the target devices through a single execution of successive operations required for the installation (hereinafter referred to as installing operations). In other words, since it is not required to repeat an installing operation, times of the number of the target devices, it is possible to reduce troublesome user operations in comparison with a conventional technique.

According to another aspect of the present invention, a method for installing drivers is provided, which includes an extracting step of extracting, from a plurality of devices connected with the information processing device, a plurality of first devices of which respective drivers for controlling the plurality of first devices are to be installed into the information processing device, and an installation executing step of consecutively installing, into the information processing device, the respective drivers of the plurality of first devices extracted in the extracting step, in a single installation.

According to the method configured as above, the same effect as the aforementioned information processing device can be provided.

According to a further aspect of the present invention, there is provided a computer readable medium having computer readable instructions stored thereon, which cause a computer configured to be connected with a plurality of devices to perform an extracting step of extracting, from the plurality of devices connected with the computer, a plurality of first devices of which respective drivers for controlling the plurality of first devices are to be installed into the computer, and an installation executing step of consecutively installing, into the computer, the respective drivers of the plurality of first devices extracted in the extracting step, in a single installation.

According to the computer readable medium configured as above, the same effect as the aforementioned information processing device or method can be provided.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the present invention will be described with reference to the accompany drawings.

(Overall Configuration)

Figure 1:
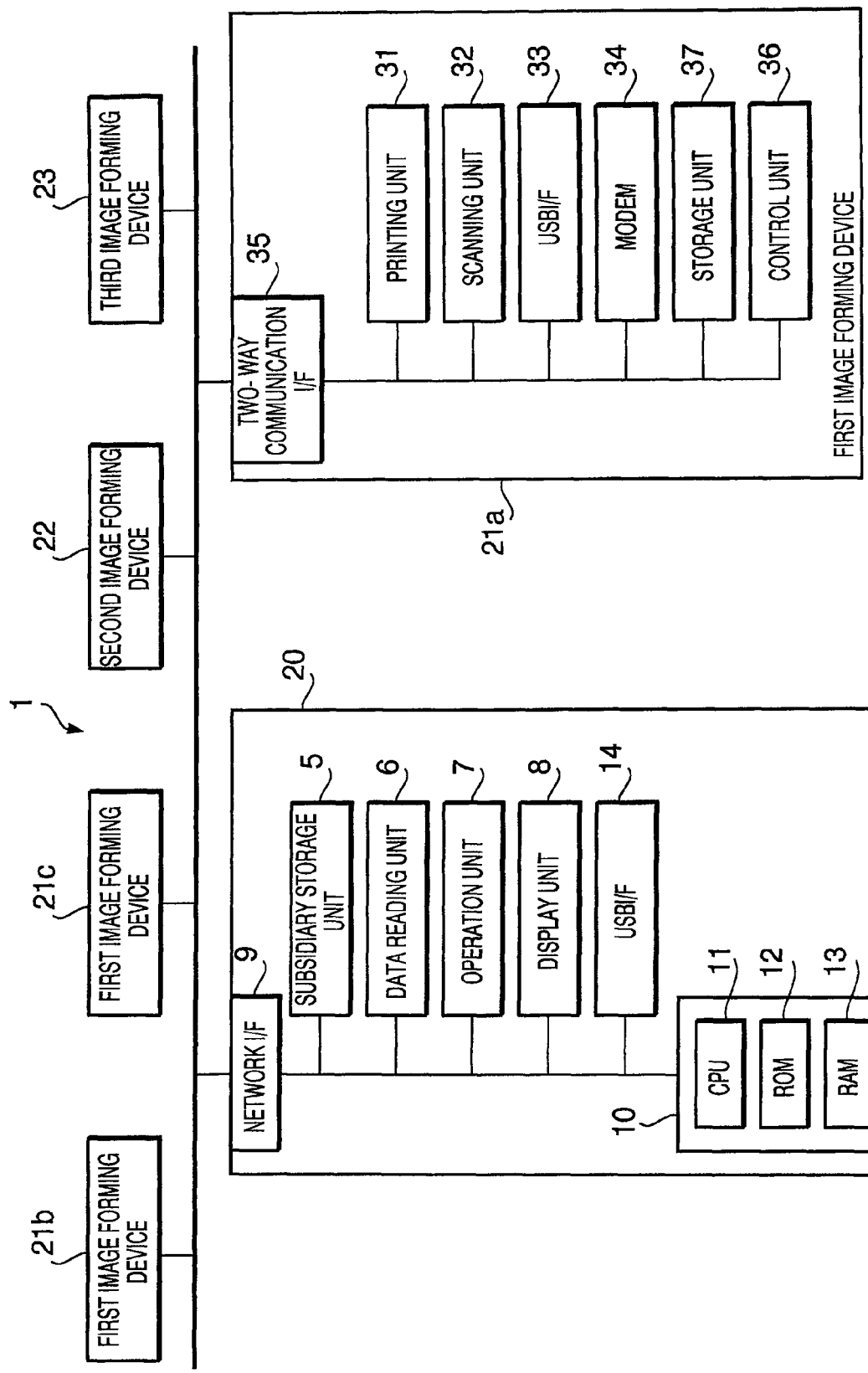
FIG. 1 is a block diagram schematically showing an overall configuration of an image forming system in an embodiment according to one or more aspects of the present invention.

FIG. 1 is a block diagram schematically showing an overall configuration of an image forming system that includes an information processing device in an embodiment according to aspects of the present invention. An image forming system 1 is provided with first image forming devices 21a to 21c, a second image forming device 22, a third image forming device 23, and an image processing device 20. The first image forming devices 21a to 21c, the second image forming device 22, the third image forming device 23, and the image processing device 20 are interconnected via a local area network (LAN).

(Configurations of Image Forming Devices)

The first image forming device 21a includes a printing unit 31, a scanning unit 32, a USB interface (I/F) 33, and a modem 34. The printing unit 31 is configured to form an image on a recording medium such as a paper based upon image data acquired from the information processing device 20 via a below-mentioned two-way communication interface (I/F) 35 or the USB I/F 33 or image data acquired from the scanning unit 32. The scanning unit 32 is configured to scan an image formed on a document (sheet). The USB I/F 33 is configured to perform data transmission and reception with an external device such as the information processing device 20 and a digital camera via a USB cable (not shown). The modem 34 is configured to perform data transmission and reception via a common communication line (not shown).

Additionally, the first image forming device 21a is provided with a two-way communication interface (I/F) 35, an operation unit (not shown), a storage unit 37, and a control unit 36. The two-way communication I/F 35 is configured to perform data transmission and reception with the information processing device 20 on the LAN therethrough. The operation unit includes cursor keys and switches for inputting therethrough various settings and commands, and a display panel for displaying thereon various menu screens, information inputted by a user, and error information. The storage unit 37 is configured to store thereon previously-inputted information regarding the first image forming device 21a. The control unit 36 is configured to control each unit (such as the printing unit 31, scanning unit 32, USB I/F 33, modem 34, two-way communication I/F 35) in accordance with settings and commands inputted via the operation unit.

The storage unit 37, which is configured with a non-volatile rewritable memory such as a flash EEPROM and a hard disk drive, stores thereon specific information required for operation of the first image forming device 21a. The specific information includes at least identification data assigned to each image forming device on the LAN such as an IP address and a node name, a model name, a serial number, and a version (ROM version or firmware version) of each image forming device.

It is noted that the first image forming devices 21b and 21c are configured in the same manner as the first image forming device 21a. The first image forming devices 21a, 21b, and 21c are of the same model manufactured by the same maker.

Accordingly, the first image forming devices 21a to 21c are configured in the same manner to attain commonly-known functions such as a scanner function of acquiring image data from a document with the scanning unit 32, a printer function of forming an image on a recording medium with the printing unit 31, a copy function of forming an image on a recording medium with the printing unit 31 based upon image data acquired from a document with the scanning unit 32, and a facsimile function of transmitting and receiving image data via the communication line with the modem 34. Further, the first image forming devices 21a to 21c have the same specifications such as an image forming speed, an image resolution, and a memory capacity.

The second image forming device 22 is configured to attain the scanner function, printer function, copy function, and facsimile function in the same manner as the first image forming device 21a. Yet, the second image forming device 22 is different from the first image forming device 21a in a part of specifications thereof. Therefore, the second image forming device 22 is of a different model from the first image forming device 21a.

The third image forming device 23 is not provided with a unit corresponding to the scanning unit 32 of the first image forming device 21a. Hence, the third image forming device 23 cannot attain the scanner function. Thus, the third image forming device 23 is of a model different from the first image forming device 21a and second image forming device 22. Hereinafter, the first image forming devices 21a to 21c, second image forming device 22, and third image forming device 23 are generically referred to as devices.

(Configuration of Information Processing Device)

Subsequently, the information processing device will be described. As shown in FIG. 1, the information processing device 20 includes a data reading unit 6, a subsidiary storage unit 5, an operation unit 7, a display unit 8, a control unit 10, a network interface (I/F) 9, and a USB interface (I/F) 14. Accordingly, the information processing device 20 is configured as a commonly-known personal computer (note: here a "personal computer" is to be broadly interpreted to include the operation unit 7 and display unit 8). The data reading unit 6 is configured to read out data stored on a CD-ROM or a DVD-ROM. The subsidiary storage unit 5 is configured to store thereon programs and data. The operation unit 7 is configured to accept therethrough a user input of various kinds of information required for operating the information processing device 20. The display unit 8 is configured to display thereon an image based upon image data to be transmitted to the devices or setting screens for configuring various settings. The control unit 10 is configured to each unit (e.g., the data reading unit 6 and operation unit 7) included in the information processing device 20. The network I/F 9 is configured to link the information processing device 20 with the LAN and perform data transmission and reception with an external device on the LAN therethrough. The USB I/F 14 is configured to perform data transmission and reception with an external device via a USB cable (not shown).

Further, the operation unit 7 is configured with a commonly-known external input device such as a mouse and a keyboard. The operation unit 7 is joined with the control unit 10 via a connection unit such as the USB I/F 14. The display unit 8 is configured with a commonly-known display device such as a liquid crystal display (LCD) device. The display unit 8 is connected with the control unit 10 via a connection unit such as a video board (not shown). The display unit 8 displays thereon a mouse pointer and user interface screens for accepting user inputs of various kinds of information.

In addition, the control unit 10 is provided with a ROM 12 that stores thereon data to be saved even in a powered-off state, a RAM 13 that stores thereon data (program) transferred from the subsidiary storage unit 5 and/or data temporarily generated in data processing, and a CPU 11 that executes programs stored in the ROM 12 and RAM 13.

The subsidiary storage unit 5 is a commonly-known hard disk drive (HDD) configured with a high capacity disk and a reading device being integrated. The subsidiary storage unit 5 is provided with at least a system folder in which various system files necessary for operating an operating system (OS) or application programs are stored and a registry in which information for operating the OS or application programs is stored.

Further, the information processing device 20 has a commonly-known operating system (OS) installed therein that has a multi-task function of concurrently executing two or more processes. Under operation of the OS, it is possible to execute application programs such as a document data creating program and an image processing program, and a below-mentioned device driver and installation program (so-called installer).

(Regarding Device Driver and Installer)

Next, there will be given a description of an installation package collecting therein device drivers for controlling respective devices corresponding thereto and installation programs for installing the device drivers into the information processing device 20.

Figure 2:
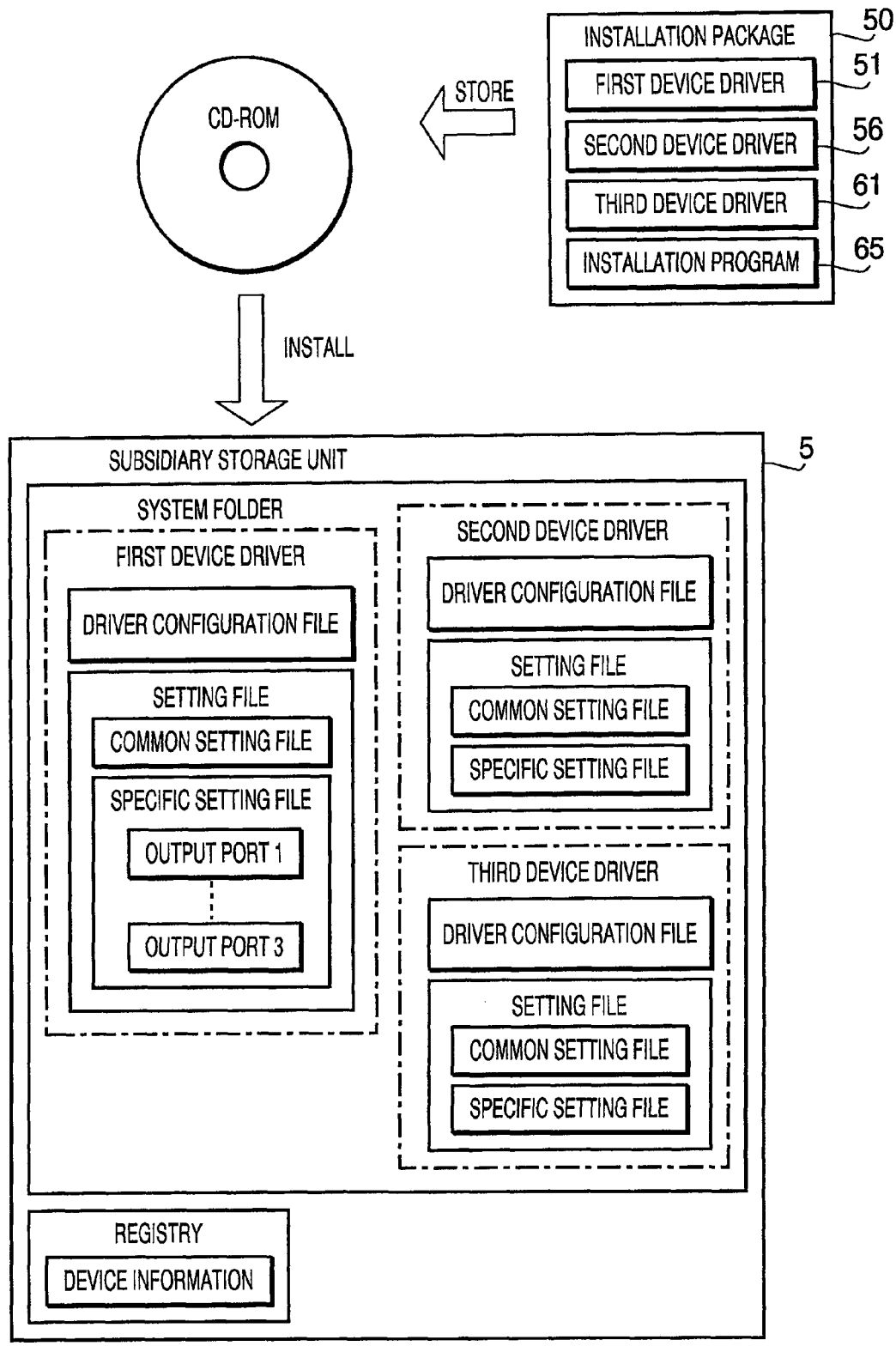
FIG. 2 is a schematic diagram for illustrating an installation package in the embodiment according to one or more aspects of the present invention.

FIG. 2 is a schematic diagram for illustrating the installation package. The installation package 50 includes a first device driver 51 for controlling the first image forming devices 21a to 21c, a second device driver 56 for controlling the second image forming device 22, a third device driver 61 for controlling the third image forming device 23, and an installation program 65 for installing the device drivers 51, 56, and 61 into a personal computer. It is noted that the installation package 50 of the present embodiment is distributed by a software provider in a state stored in a removable recording medium such as a CD-ROM and a DVD-ROM, and read out by a reading device accepting the removable recording medium such as the data reading unit 6 (see FIG. 1) of the information processing device 20.

Further, it is noted that the "device drivers" referred to here include drivers required for controlling functions of the devices image forming devices such as a printer driver for controlling the printer function of each of the devices and a scanner driver for controlling the scanner function of each of the devices.

Incidentally, the "installation of the device drivers" referred to here represents a following commonly-known process: A setting file to which the information processing device 20 refers in the case of controlling a device is created, and the created setting file and a driver configuration file for controlling the device that is included in a corresponding device driver are stored into a specified area (for instance, a system folder) of the subsidiary storage unit 5 that is managed by the OS. Concurrently, device information including correspondence relationship between the aforementioned files and the device (for example, a reference destination of the files) is registered with the registry.

It is noted that the setting file includes a specific setting file configured for each device with a setting of an output port based upon an IP address of each device and a common setting file configured to define control settings (as described below) in use of the devices.

Namely, when the device drivers corresponding to all of the devices (the first to third image forming devices) are installed in the present embodiment, as shown in FIG. 2, the respective driver configuration files and setting files of the first to third device drivers are stored in the system folder. In particular, the first device driver 51 is installed into the three first image forming devices 21a, 21b, and 21c. Therefore, the driver configuration file and common setting file are shared among the first image forming devices 21a, 21b, and 21c, yet the setting file of the first device driver includes respective specific setting file of the first image forming devices 21a, 21b, and 21c.

(Install Process)

Subsequently, an installation process to be executed by the CPU 11 in accordance with the installation program will be described.

Figure 3:
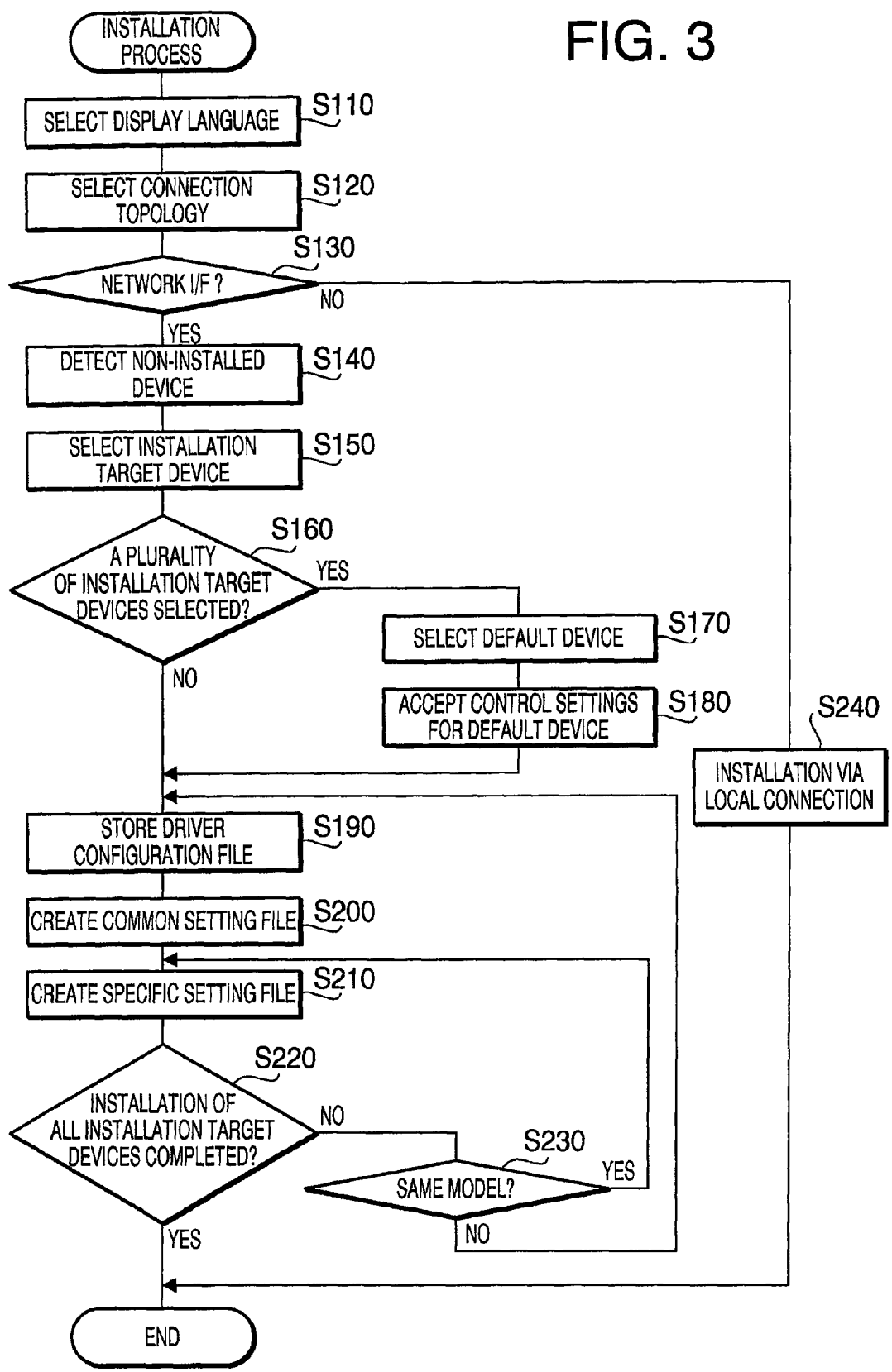
FIG. 3 is a flowchart showing a procedure of an installation process in the embodiment according to one or more aspects of the present invention.

FIG. 3 is a flowchart showing a procedure of an installation process. The installation process is configured to be executed when the installation package is read out by the data reading unit 6. As shown in FIG. 3, when the installation process is booted, first, a setting input screen for selecting a display language is displayed on the display unit 8 in S110. Then, after a display language is selected through the setting input screen, the present process goes to S120.

It is noted that the "setting input screen" represents a user interface screen displayed on the display unit 8 to accept an input through the operation unit 7. Further, the "display language" denotes a language for a text displayed on the setting input screen. Additionally, the display language selectable in S110 includes Japanese, English, French, Spanish, Arabic, and Pekingese. The following description will be given under an assumption that Japanese is selected as the display language.

In a subsequent step S120, a setting input screen for selecting a connection topology between a device as an installation target in the present installation process and the information processing device 20 is displayed on the display unit 8. When a connection topology is selected through the setting input screen, the present process goes to S130. Selectable connection topologies, specifically, include a connection through the LAN (hereinafter referred to as a network connection) and a connection through the USB cable (hereinafter referred to as a local connection).

In S130, it is determined whether the connection topology selected in S120 is the network connection. When it is determined that the connection topology is the network connection (S130: Yes), the present process goes to S140, in which the CPU 11 detects devices connected with the information processing device 20 via the LAN, and extracts devices of which the device drivers are not installed in the information processing device 20 (hereinafter referred to as non-installed devices) from the detected devices. Specifically, in the present embodiment, the CPU 11 transmits a command signal to all the image forming devices 21a to 21c, 22, and 23 so as to instruct the devices to send out the respective specific information stored in the storage units 37 thereof. Then the CPU 11 acquires the specific information sent out by the image forming devices 21a to 21c, 22, and 23 that have received the command signal. Thereafter, the CPU 11 recognizes, as the non-installed devices, such devices that identification data in the specific information acquired therefrom do not correspond to the device information registered with the registry provided on the subsidiary storage unit 5.

Further, in S150, the CPU 11 displays on the display unit 8 a setting input screen 70 (hereinafter referred to as a target device input screen 70, see FIG. 4) for selecting a device (hereinafter referred to as an installation target device) of which the device driver is to be installed in the information processing device 20 from all non-installed devices extracted in S140. Then, after the CPU 11 accepts an installation target device selected by the user through the target device input screen 70, the present process goes to S160.

Figure 4:
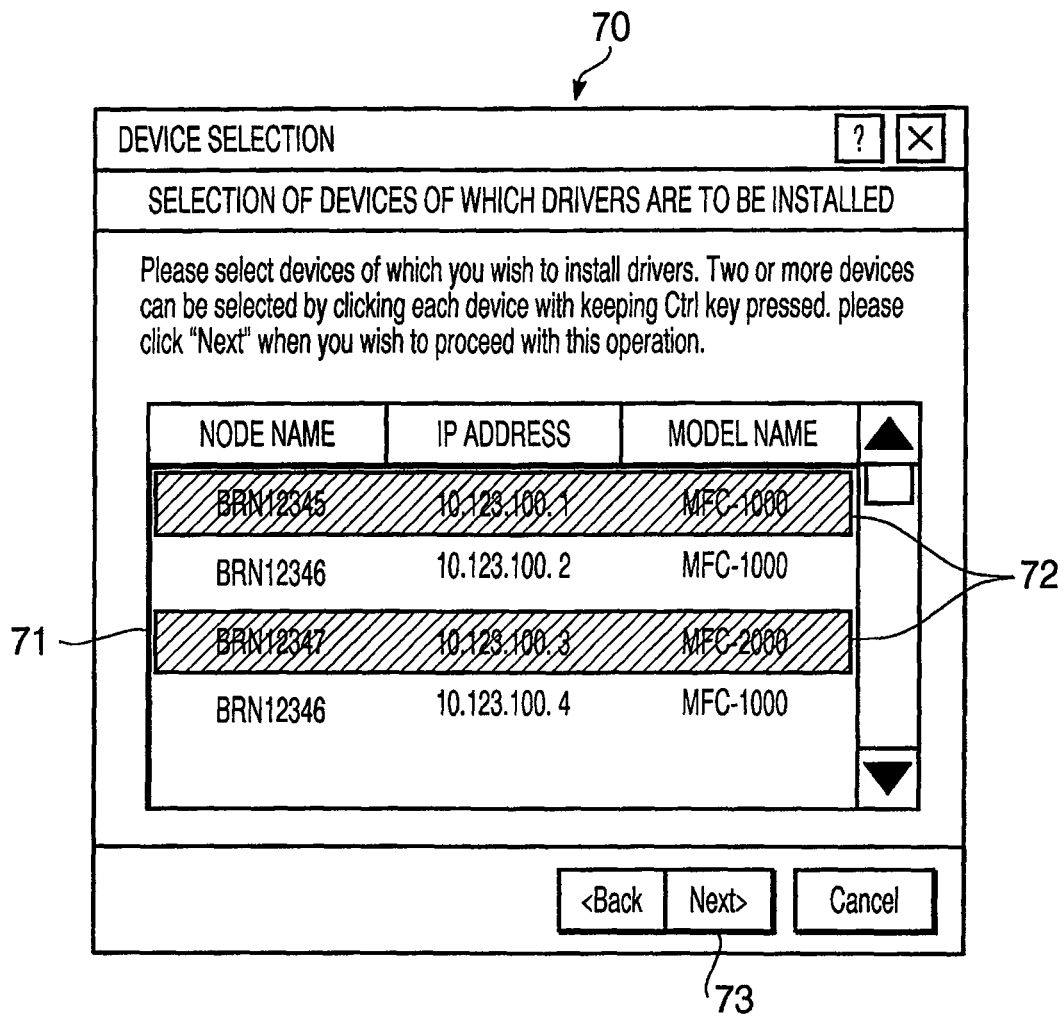
FIG. 4 is a schematic diagram exemplifying a target device input screen in the embodiment according to one or more aspects of the present invention.

It is noted that the target device input screen 70 is, as illustrated in FIG. 4, provided with at least a device information display section 71 for displaying information on the non-installed devices, selected-device indication(s) 72 representing that the selected non-installed devices are installation target devices, and a "Next" button 73 representing that the selection is completed.

The target device input screen 70 is configured to accept one or more devices as the installation target devices. Namely, the installation target device selected may be one or more. In addition, the device information display section 71 is configured to display thereon at least a node name, an IP address, and a model name of each of the non-installed devices.

In the present embodiment, when the "Next" button 73 is pressed, the selected non-installed devices are accepted as the installation target devices. It is noted that, in the present embodiment, a device indicated with a node name "BRN12345" is the first image forming device 21*b*, a device indicated with a node name "BRN12346" is the first image forming device 21*c*, a device indicated with a node name "BRN12347" is the second image forming device 22, and a device indicated with a node name "BRN12348" is the third image forming device 23.

In a subsequent step S160, it is determined whether a plurality of devices are selected as the installation target devices in S150. When it is determined that a plurality of devices are selected as the installation target devices in S150 (S160: Yes), the present process goes to S170.

In S170, there is displayed on the display unit 8, a setting input screen 75 (hereinafter referred to as a default device input screen 75, see FIG. 5) for selecting a normally used device by default from the installation target devices selected in S150. When a default device is selected by the user through the default device input screen 75, the present process goes to S180.

However, in this respect, the default device can be selected only when two or more installation target devices having the same function are selected in S150. When two or more installation target devices having only their respective different functions are selected in S150, the present process goes to S180 without executing S170.

For example, when all the installation target devices have the same function such as the printer function, the installation target devices are likely to be more convenient and user-friendly than a device whose device driver has already been installed in the information processing device. Therefore, in the installation process of the present embodiment, the most convenient and user-friendly one can be selected as the default device from the convenient and user-friendly installation target devices.

However, when the installation target devices have only respective different functions thereof (for example, as a case where the installation target devices are an installation target device having only the printer function and an installation target device having only the scanner function), the installation target devices are utilized separately depending on a function that the user wishes to use. Hence, in the installation process of the present embodiment, when the installation target devices have only respective different functions thereof, the present process goes to S180 without having the user select a default device from the installation target devices.

It is noted that the default device referred to here represents a device to be automatically selected first when the user of the information processing device uses a device of the installation target devices. Accordingly, when the user wishes to use a device different from the default device, the user has to select an intended device on a setting screen displayed on the display unit 8 before using the intended device.

Figure 5:
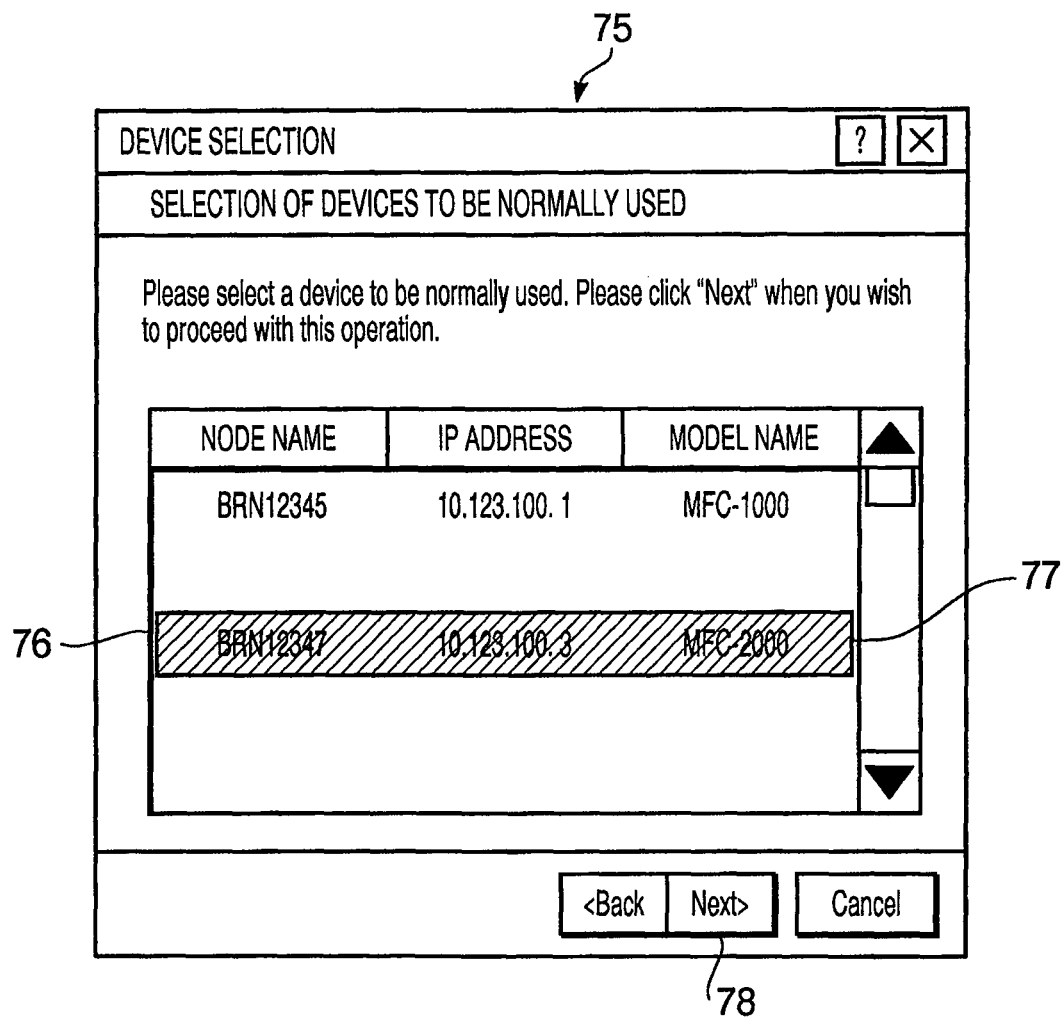
FIG. 5 is a schematic diagram exemplifying a default device input screen in the embodiment according to one or more aspects of the present invention.

As illustrated in FIG. 5, the default device input screen 75 of the present embodiment is provided with at least a target device information display section 76 for displaying thereon information on the installation target devices, a selected-device indication 77 indicating that the installation target device selected is the default device, and a "Next" button 78. In addition, the target device information display section 76 is configured to display thereon at least a node name, an IP address, and a model name of each of the installation target devices. Then, in the present embodiment, when the "Next" button 78 is pressed, the installation target device being selected is accepted as the default device. In the present embodiment, the second image forming device 22 specified with the node name "BRN12347" is selected as the default device.

In a subsequent step S180, there is displayed on the display unit 8, a setting input screen 80 (hereinafter refereed to as a control setting input screen 80, see FIG. 6) for inputting therethrough control settings for controlling the default device.

Figure 6:
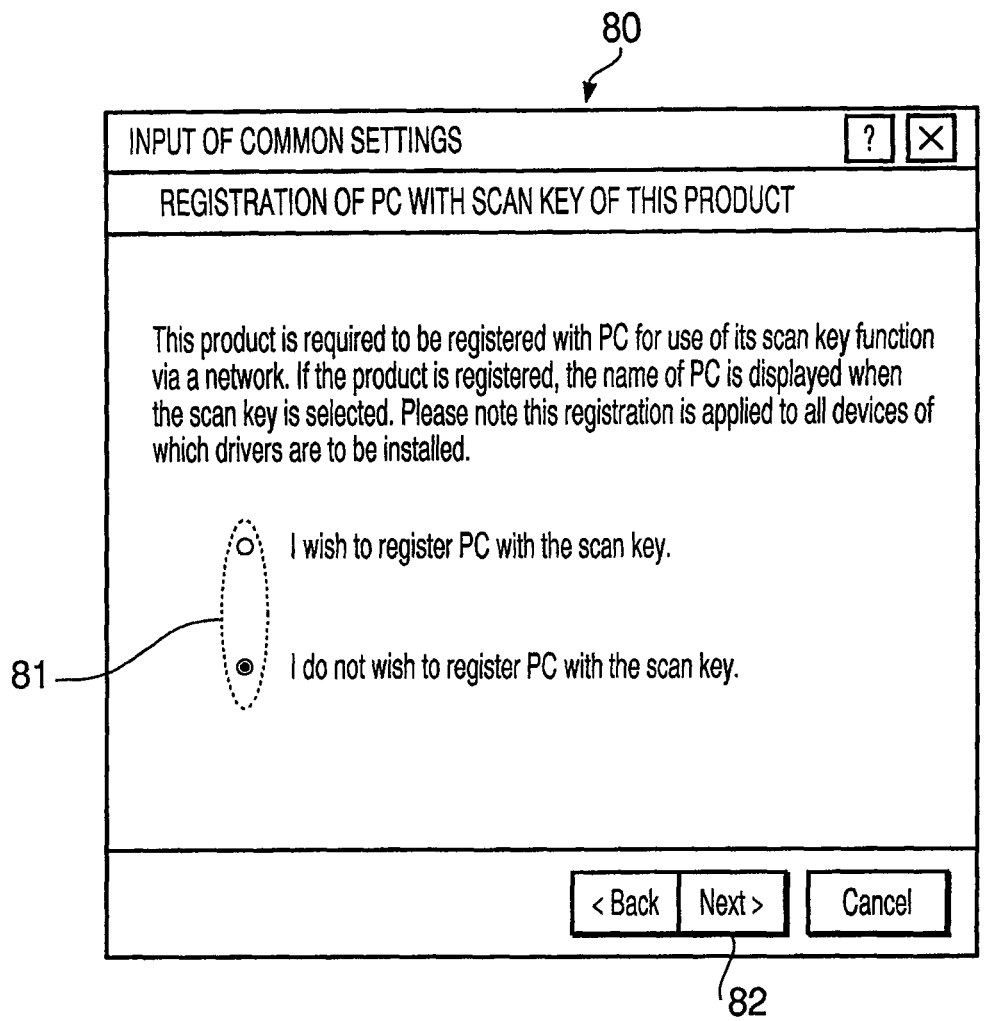
FIG. 6 is a schematic diagram exemplifying a control setting input screen in the embodiment according to one or more aspects of the present invention.

The control setting input screen 80 of the present embodiment is, as shown in FIG. 6, provided with at least input acceptance indications 81 for accepting an input of the control settings and a "Next" button 82. Further, the control settings of the present embodiment include a scan key setting that makes it possible to send scanned image data to the information processing device 20 in use of the scanner function of the default device, and a printer setting for setting which mode is applied as a default mode between a monochrome printing mode and a color printing mode in use of the printer function of the default device.

When the input of the control settings is accepted through the control setting input screen 80, the present process goes to S190. It is noted that, in the present embodiment, when the "Next" button 82 is pressed, the control settings inputted are accepted.

When it is determined in S160 that a single device is selected as the installation target device(s) in S150 (S160: No), the present process goes to S190. In S190, one installation target device is extracted from all the installation target devices selected in S150, and a driver configuration file of a device driver corresponding to the extracted installation target device is stored into the system folder of the subsidiary storage unit 5 and registered with the registry. It is noted that, when the default device is selected in S170, the default device is first extracted in S190 of the present embodiment.

Further, in S200, a common setting file, including the control settings of which the input has been accepted in S170, is created, stored in the system folder of the subsidiary storage unit 5, and registered with the registry. However, in this respect, when it is determined in S160 that a single device is selected as the installation target device(s) in S150 (S160:

No), a common setting file including control settings previously set in the device driver of the installation target device selected is created.

Then, in S210, based upon the IP address acquired in S140, a specific setting file configured with a setting of the output port is created, stored in the system folder of the subsidiary storage unit 5, and registered with the registry.

In a subsequent step S220, it is determined whether the installation of the device drivers corresponding to all the installation target devices (namely, steps of S190 to S210) is completed. When it is determined that the installation of the device drivers corresponding to all the installation target devices is not completed, the present process goes to S230.

In S230, one installation target device (hereinafter referred to as a current target device) is extracted from installation target devices of which device drivers have not yet been installed, and it is determined whether the current target device is of the same model as an installation target device of which a device driver has previously been installed (hereinafter referred to as a previous target device).

Then, when it is determined that the current target device is of the same model as an installation target device of which a device driver has previously been installed (S230: Yes), the present process goes back to S210. Specifically, since the driver configuration file and common setting file of the current target device are identical to those of the previous target device, they are commonly used. Meanwhile, a specific setting file different from that of the previous target device is only created as a file dedicated to the current target device, stored in the system folder of the subsidiary storage unit 5, and registered with the registry.

Meanwhile, when it is determined that the current target device is not of the same model as an installation target device of which a device driver has previously been installed (S230: No), the present process goes back to S190. However, in this respect, in S190, such an operation that one installation target device is extracted from all the installation target devices is performed, and the device driver corresponding to the current target device extracted in S230 is installed.

Accordingly, the driver configuration file, common setting file, specific setting file of the current target device are stored into the system folder and registered with the registry. It is noted that, in this case, the control settings included in the common setting file are desired to be ones on which the control settings of the default device, of which the input has been accepted in S170, are reflected, yet may be default control settings of the device driver corresponding to the current target device.

When it is determined that the installation of the device drivers corresponding to all the installation target devices is completed (S220: Yes), the present installation process is terminated.

In the present embodiment, the device driver is installed, which corresponds to the second image forming device 22 as the default device in first-performed steps of S190 to S210 between the first image forming device 21b (see FIG. 1) represented with the node name "BRN12345," and the second image forming device 22 (see FIG. 1) represented with the node name "BRN12347" which are selected on the target device input screen 70 shown in FIG. 4. Then, since installation of the device driver corresponding to the first image forming device 21b is not completed, the present process goes to S230 in response to negative determination in S220 (S220: No). Thereafter, since the first image forming device 21b is of a different model from the second image forming device 22, the present process goes to S190 in response to negative determination in S230 (S230: No). In next-performed steps of S190 to S210, the device driver corresponding to the first image forming device 21b is installed, and then the present installation process is terminated.

Meanwhile, when it is determined in S130 that the connection topology selected in S120 is not the network connection (namely, it is the local connection), the present process goes to S240, in which a device driver corresponding to a single device linked with the information processing device 20 via the local connection is installed. Thereafter, the present installation process is terminated.

Namely, in the installation process, non-installed devices are detected from the image forming devices connected with the LAN, and installation target devices are selected by the user from the non-installed devices detected. Then, device drivers corresponding to all the installation target devices selected are consecutively installed in the aforementioned single installation process.

Effects of Embodiment

As described above, according to the installation program of the present embodiment, even though a plurality of non-installed device are detected, the device drivers corresponding to the non-installed devices detected can be installed through successive operations necessary for the installation (hereinafter referred to as installing operations) performed by the user just once. Namely, according to the installation program of the present embodiment, the installing operations are not required to be repeated times of the number of the non-installed devices when the device drivers corresponding to the non-installed devices are to installed. Thus, troublesome operations to be performed by the user can be reduced in comparison with conventional techniques.

Further, in the installation program of the present embodiment, the settings for the default device selecting from the installation target devices having the same function are accepted. Then, the accepted settings for the default device selected are incorporated into the setting file when the device driver thereof is installed.

Therefore, according to the installation program of the present embodiment, operations of setting an installation device to be used when attempting to actually use the installation target device can be reduced.

Further, the installation program of the present embodiment is configured to accept the input of the control settings for the default device. When the device driver of the default device is installed, the accepted control settings are incorporated into the setting files of the default device and installation target devices other than the default device (hereinafter referred to as non-default devices).

Therefore, according to the installation program of the present embodiment, operations of inputting the control settings in use of the default device or the non-default devices can be reduced. In addition, the same control settings can be configured to all the installation target devices through a single input.

Additionally, according to the installation program of the present embodiment, the non-installed devices are automatically detected with the specific information acquired from the devices connected with the LAN. Hence, user operations of inputting information can be reduced. Thus, a convenient installation program can be provided, in particular, for a user with a poor knowledge of the devices, information processing device, and program.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

(Modifications)

Figure 7:
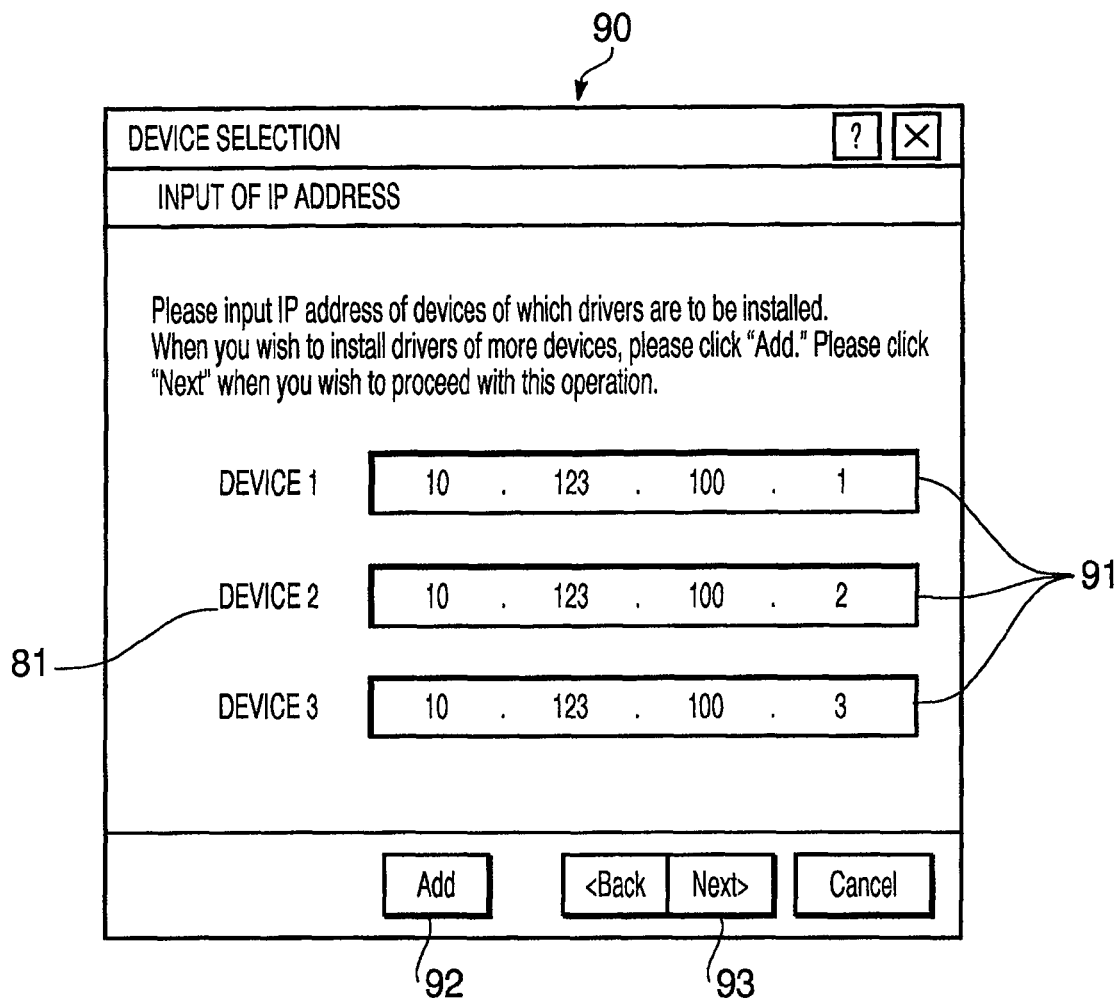
FIG. 7 is a schematic diagram exemplifying an identification data input screen in the embodiment according to one or more aspects of the present invention.

In S140 of the installation process in the above embodiment, so as to extract the non-installed devices, the specific information (more exactly, the identification data) thereof is acquired from the devices connected with the LAN. However, a method to acquire the identification data of the non-installed devices is not limited to the above method. Specifically, identification data may be acquired, which is inputted via a setting input screen 90 for inputting the identification data (hereinafter referred to as an identification data input screen 90) as illustrated in FIG. 7. Then, by pressing a below-mentioned "Next" button 93, the default device input screen 75 (see FIG. 5) may be displayed based upon the identification data acquired.

Namely, an input of information may be accepted in accordance with external operations, and the accepted information may be acquired as the identification data. In this case, it is desired that only devices corresponding to the acquired identification data are identified as the non-installed devices. Additionally, the aforementioned method to acquire the identification data inputted by the user through the identification data input screen 90 may only be carried out, or may be carried out in addition to the acquisition of the specific information (more exactly, the identification data) from the devices connected with the LAN.

It is noted that such an identification data input screen 90 has to include at least input sections 91 for inputting the respective identification data of the devices on a device-by-device basis, an "Add" button 92 for adding an input section 91 depending on the number of the devices, and a "Next" button 93. The identification data input screen 90 shown in FIG. 7 is configured to accept an input of a corresponding IP address into each input section 91, yet may be configured to accept an input of a node name.

Additionally, in S150 of the installation process in the above embodiment, the installation target devices are selected from all the non-installed devices. However, the installation target devices may be selected from devices having the same attribute such as the same maker and the same model among all the non-installed devices. Namely, only non-installed devices with the same attribute may be selected as the installation target devices.

For example, when non-installed devices manufactured by the same maker are selected as the installation target devices, only devices with respective serial numbers in the specific information including a character string such as "BROTHER" which represents the maker thereof may be displayed as the non-installed devices on the target device input screen 70 (see FIG. 4).

For example, when non-installed devices of the same model are selected as the installation target devices, only devices with model information on a previously-set model (for instance, a model name of "MFC-1000" shown in FIG. 4) may be displayed as the non-installed devices on the target device input screen 70.

It is noted that the aforementioned same attribute may include the same function such as the printer function and copy function. In this case, functions of the devices may be judged, for example, based upon the specific information (e.g., the model names) thereof.

In the meantime, in S150 of the installation process in the above embodiment, the installation target devices are selected by the user. However, all the non-installed devices detected in S140 may be recognized as the installation target devices. Namely, the step S150 may be omitted.

Additionally, in S170 of the installation process of the above embodiment, when devices having the same function are selected as the installation target devices, a default device can be selected. However, for example, when a plurality of installation target devices are selected in S150, a default device may be selected regardless of functions of the installation target devices selected.

Further, in the image forming system 1 of the above embodiment, the device drivers are acquired from the recording medium. However, for example, the image forming system 1 may be configured to make the devices previously hold the respective device drivers and acquire the device drivers via the LAN or from a server connected with the LAN.

In the installation process of the above embodiment, the non-installed devices are only extracted. However, devices of which device drivers have already been installed in the information processing device 20 (hereinafter referred to as installed devices) may be extracted as well. In this respect, it is noted that, when the installed devices are extracted, device drivers corresponding to the installed devices have to be reinstalled into the information processing device 20 in the steps of S190 to S210 in the installation process.

In particular, when the installation process is configured to extract the installed devices as well, all the devices connected with the network may be extracted in S140 of the installation process, and all the devices may be displayed in S150.

Further, in the above embodiment, the first image forming devices 21a to 21c, the second image forming device 22, and the third image forming device 23, which have a plurality of functions, are defined as the devices. However, a printing device having only a printer function or a scanning device having only a scanner function may be defined as the device.

What is claimed is:

1. An information processing device comprising:
   a network interface configured to connect the information processing device with a plurality of devices via a network interface; and
   a controller configured to, upon executing computer readable instructions, cause the information processing device to provide:
      a determining unit configured to determine whether one or more installation target devices are connected with the information processing device via the network interface;
      a device extracting unit configured to, in response to determining that one or more installation target devices are connected with the information processing device via the network interface, extract, from the plurality of devices connected with the information processing device via the network interface, identification data of a plurality of installation target devices of which respective drivers for controlling the plurality of installation target devices are to be installed into the information processing device;

a default setting unit configured to, in response to determining that the extracted plurality of installation target devices includes two or more devices having a same function, select a default device, to be used as a default, from among the two or more devices having the same function, wherein the remaining devices are non-default devices; and an installation executing unit configured to consecutively install, into the information processing device, the respective drivers of the plurality of installation target devices extracted by the device extracting unit, in a single installation, wherein:

when the default device is selected from among the two or more installation target devices having the same function, the selected default device is first extracted as a current installation target device of the plurality of installation target devices, and the installation executing unit installs, into the information processing device:

a driver configuration file configured to be executed by the information processing device to control the current installation target default device; and a setting file configured such that the information processing device refers thereto when controlling the current installation target default device, the setting file comprising:

a common setting file that is common to devices of a same model as the current installation target device; and a specific setting file created specifically for the current installation target default device;

when determining that a subsequently-extracted current installation target device is the non-default device of the plurality of installation target devices and is not of the same model as the previous installation target default device for which a driver has previously been installed, the installation executing unit installs, into the information processing device:

a driver configuration file configured to be executed by the information processing device to control the current installation target non-default device; and a setting file configured such that the information processing device refers thereto when controlling the current installation target non-default device, the setting file comprising:

a common setting file that is common to devices of a same model as the current installation target non-default device; and a specific setting file created specifically for the current installation target non-default device, and when determining that the subsequently-extracted current installation target device is the non-default device and is of the same model as the previous installation target default device, the installation executing unit installs, into the information processing device, the specific setting file provided specifically for the current installation target non-default device, while setting the driver configuration file and the common setting file of the previous installation target default device to be used in common as the driver configuration file and the common setting file of the current installation target non-default device.

2. The information processing device according to claim 1, wherein the controller is further configured to, upon executing computer readable instructions, cause the information processing device to provide a device detecting unit configured to detect, from the plurality of devices connected with the information processing device, a plurality of second devices of which drivers have not yet been installed in the information processing device, wherein the device extracting unit is configured to extract the plurality of installation target non-default devices from the plurality of second devices detected by the device detecting unit.

3. The information processing device according to claim 2, wherein the device extracting unit includes:

a presenting unit configured to present the plurality of second devices detected by the device detecting unit; and a selecting unit configured to accept selection of the plurality of installation target non-default devices from the plurality of second devices presented by the presenting unit.

4. The information processing device according to claim 2, wherein the controller is further configured to, upon executing computer readable instructions, cause the information processing device to provide:

a data acquiring unit configured to acquire first identification data for identifying the plurality of devices connected with the information processing device; and a data saving unit configured to save thereon second identification data for identifying at least one third device of which a driver has already been installed in the information processing device, wherein the device detecting unit is configured to detect the plurality of second devices by comparing the first identification data acquired by the data acquiring unit with the second identification data saved on the data saving unit.

5. The information processing device according to claim 4, further comprising an input unit configured to accept an input of data therethrough, wherein the data acquiring unit acquires the first identification data through the input unit.

6. The information processing device according to claim 4, wherein the network interface includes a receiving unit configured to receive data from the plurality of devices connected with the information processing device, and wherein the data acquiring unit acquires the first identification data through the receiving unit.

7. The information processing device according to claim 1, wherein the device extracting unit is configured to extract the plurality of installation target non-default devices from a plurality of fourth devices which have an identical attribute previously defined among the plurality of devices connected with the information processing device.

8. The information processing device according to claim 7, wherein the attribute previously defined represents a maker of the plurality of fourth devices.

9. The information processing device according to claim 7, wherein the attribute previously defined represents a function of the plurality of fourth devices.

10. The information processing device according to claim 1, wherein the controller is further configured to, upon executing computer readable instructions, cause the information processing device to provide a setting accepting unit configured to accept control settings for the default device set by the default setting unit, the control settings being referred to for controlling the default device, and wherein, when installing a driver of the default device, the installation executing unit incorporates the control settings accepted by the setting accepting unit into the driver of the default device.

11. The information processing device according to claim 10, wherein, when installing a driver of at least one non-default device among the plurality of installation target devices, the installation executing unit incorporates the control settings accepted by the setting accepting unit into the driver of the at least one non-default device.

12. The information processing device according to claim 1, wherein the device extracting unit is configured to extract the plurality of installation target devices including a driver-installed device of which a driver has already been installed in the information processing device, and wherein, when the device extracting unit extracts the driver-installed device, the installation executing unit re-installs the driver-installed device into the information processing device.

13. A method for installing drivers, comprising:

a determination step of determining whether one or more installation target devices are connected with an information processing device via a network interface;

an extracting step of extracting, in response to determining that one or more installation target devices are connected with the information processing device via the network interface, from a plurality of devices connected with the information processing device through the network interface, identification data of a plurality of installation target devices of which respective drivers for controlling the plurality of installation target devices are to be installed into the information processing device;

a default setting step of, in response to determining that the extracted plurality of installation target devices includes two or more devices having a same function, selecting a default device, to be used as a default, from among the two or more devices having the same function, wherein the remaining devices are non-default devices; and an installation executing step of consecutively installing, into the information processing device, the respective drivers of the plurality of installation target devices extracted, in the extracting step in a single installation, wherein:

when the default device is selected from among the two or more installation target devices having the same function, the selected default device is first extracted as a current installation target device of the plurality of installation target devices, and the installation executing unit installs, into the information processing device:

a driver configuration file configured to be executed by the information processing device to control the current installation target default device; and a setting file configured such that the information processing device refers thereto when controlling the current installation target default device, the setting file comprising:

a common setting file that is common to devices of a same model as the current installation target device; and a specific setting file created specifically for the current installation target default device;

when determining that a subsequently-extracted current installation target device is the non-default device of the plurality of installation target devices and is not of the same model as the previous installation target default device for which a driver has previously been installed, the installation executing step includes installing, into the information processing device:

a driver configuration file configured to be executed by the information processing device to control the current installation target non-default device; and a setting file configured such that the information processing device refers thereto when controlling the current installation target non-default device, the setting file comprising:

a common setting file that is common to devices of a same model as the current installation target non-default device; and a specific setting file created specifically for the current installation target non-default device, and when determining that the subsequently-extracted current installation target device is the non-default device and is of the same model as the previous installation target default device, the installation executing step includes installing, into the information processing device, the specific setting file provided specifically for the current installation target non-default device, while setting the driver configuration file and the common setting file of the previous installation target default device to be used in common as the driver configuration file and the common setting file of the current installation target non-default device.

14. A non-transitory computer readable medium having computer readable instructions stored thereon, which, when executed, cause a computer configured to be connected with a plurality of devices to perform:

a determination step of determining whether one or more installation target devices are connected with the computer via a network interface;

an extracting step of extracting, in response to determining that one or more installation target devices are connected with the computer via the network interface, from the plurality of devices connected with the computer through the network interface, identification data of a plurality of installation target devices of which respective drivers for controlling the plurality of installation target devices are to be installed into the computer;

a default setting step of, in response to determining that the extracted plurality of installation target devices includes two or more devices having a same function, selecting a default device, to be used as a default, from among the two or more devices having the same function, wherein the remaining devices are non-default devices; and an installation executing step of consecutively installing, into the computer, the respective drivers of the plurality of installation target devices extracted in the extracting step, in a single installation, wherein:

when the default device is selected from among the two or more installation target devices having the same function, the selected default device is first extracted as a current installation target device of the plurality of installation target devices, and the installation executing unit installs, into the information processing device:

a driver configuration file configured to be executed by the information processing device to control the current installation target default device; and a setting file configured such that the information processing device refers thereto when controlling the current installation target default device, the setting file comprising:

a common setting file that is common to devices of a same model as the current installation target device; and a specific setting file created specifically for the current installation target default device;

when determining that a subsequently-extracted current installation target device is the non-default device of the plurality of installation target devices and is not of the same model as the previous installation target default device for which a driver has previously been installed, the installation executing step includes installing, into the computer:

a driver configuration file configured to be executed by the computer to control the current installation target non-default device; and a setting file configured such that the computer refers thereto when controlling the current installation target non-default device, the setting file comprising:

a common setting file that is common to devices of a same model as the current installation target non-default device; and a specific setting file created specifically for the current installation target non-default device, and when determining that the subsequently-extracted current installation target device is the non-default device and is of the same model as the previous installation target default device, the installation executing step includes installing, into the computer, the specific setting file provided specifically for the current installation target non-default device, while setting the driver configuration file and the common setting file of the previous installation target default device to be used in common as the driver configuration file and the common setting file of the current installation target non-default device.

* * * * *